Jan. 2, 1934.   S. W. CRAWFORD   1,941,788
BEARING
Filed April 27, 1929
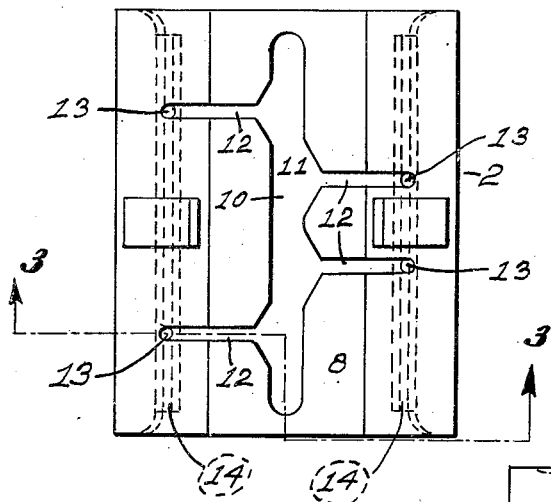
Fig·1·
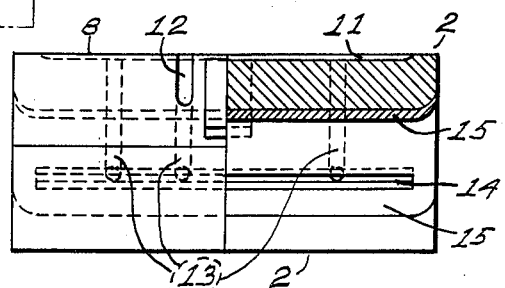
Fig·2·
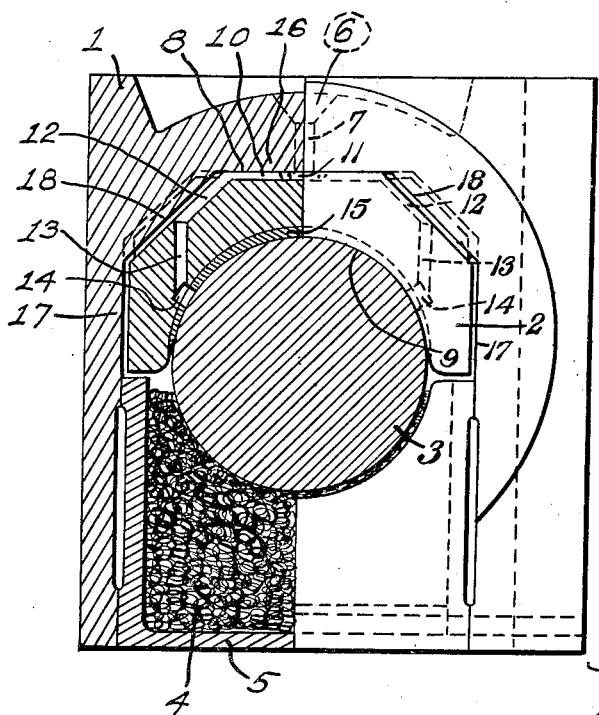
Fig·3·
INVENTOR:
Samuel W. Crawford,
BY Hugh H. Wagner,
ATTORNEY.

Patented Jan. 2, 1934

1,941,788

UNITED STATES PATENT OFFICE 1,941,788

BEARING

Samuel W. Crawford, St. Louis, Mo., assignor to National Bearing Metals Corporation, St. Louis, Mo., a corporation of New York Application April 27, 1929. Serial No. 358,568

6 Claims. (Cl. 308—81)

This invention relates to bearings, and has more particular reference to auxiliary means for lubricating the bearings in which are journaled the axles of the front trucks or trailing trucks of locomotives.

Such bearings, as is well known, are ordinarily lubricated in the conventional manner by lubricant-holding sponge or waste that is carried in a cellar under the journal and is adapted to wipe against the under-side of the journal. When stops are made, these bearings are inspected, and any hot boxes that may be discovered are supplied with an emergency supply of lubricating oil through oil ports that lead through the crown of the brass to the top of the journal. In actual practice, however, this auxiliary means for lubricating a hot box at the top of the journal is not very effective, for the reason that, as the journal becomes hot, the bearing expands, so that the journal sides of the bearing do not bear on the journal and the weight borne by the journal is localized on the top thereof, producing an excessive pressure per unit area of bearing surface thereat, which seals the opening of the port at the point where it communicates with the journal and thus prevents the oil from adhering to the journal and being carried around thereby. This is especially true where the bearing is lined with babbitt.

Accordingly, an object of the present invention is the provision of means for supplying the auxiliary lubricant to the sides rather than to the top of the bearing.

Another object is the provision of a bearing of this character that is so constructed that the supply of lubricant will be regulated automatically in accordance with the needs of the bearing.

Another object of the invention is to provide a bearing which will distribute the lubricant to the sides of the internal surface thereof when the lubricant is supplied to the top of the bearing through the conventional portway in the top of the box.

Another object of the invention is to provide a bearing whose oil passageways are so arranged that portions thereof may be readily cast with the bearing while other portions may be conveniently produced by drilling, thereby enabling the passageways to be formed at a minimum expense of time and labor.

Other objects and advantages will be apparent in the course of the following description of a preferred embodiment of the invention.

In the accompanying drawing forming part of this specification, in which like numbers of reference denotes like parts wherever they occur, Figure 1 is a plan view of the bearing of this invention;

Figure 2 is a view of the same that is partly a side elevation and partly a longitudinal vertical central section; and Figure 3 is an end elevation, partly in section on the line 3—3 in Figure 1, showing the bearing and so much only of the truck box as will suffice to show its connection therewith.

The truck boxes to which this invention is especially applicable comprise conventionally an outer structure 1, and a bearing 2 that is preferably cast of brass or bronze and is better known in the art as a trailer or engine truck bearing. Lubricant is normally supplied to the journal of the axle 3 by means of waste 4, carried in the lubricant-holding cellar 5, borne by the outer structure 1 under the axle 3, which is usually formed of steel. When a hot box results, an auxiliary supply of lubricant in the form of oil is introduced into the well 6 in the top of the box 1 and passes down through port 7 in the box 1. Prior to this invention, the oil descended from port 7 through a port that extended down through the bearing 2 and opened into the upper or middle portion of the internal surface 9 of the bearing 2. As heretofore stated, the expansion of the bearing 2 incident to the heating caused by frictional resistance restricts the area of contact of the journal of axle 3 and the bearing 2 to the upper portion of the internal surface 9, which is the point whereat the oil port has heretofore opened into the surface 9, and, as the restriction of the area of contact manifestly increases the pressure per unit area of contact, the excessive pressure of the axle against the surface 9 at the oil port forms a fluid tight joint thereat which prevents the flow of lubricant from the well 6 to those contacting surfaces where it is most needed.

In the bearing 2 of the present invention, this difficulty is surmounted by feeding the emergency supply of oil to lateral portions of the surface 9. This distribution of the lubricant is effected by providing a recess or pocket 10 in the top surface 8 of the bearing 2. This recess is of such formation that it may be easily cast with the bearing and is fully exposed upon removal of the bearing 2 from the box 1 so as to be readily accessible for cleaning or inspection. The recess 10 preferably comprises a longitudinally elongated central well portion or groove 11, and transversely disposed grooves 12, that branch off at intervals from either side of the well 11 and lead to portways 13, that extend upwardly through the bearing 2 from longitudinally extending distribution grooves 14, recessed or cut into opposing respective lateral portions of the internal surface 9 of the bearing 2. In the particular illustrative embodiment of the invention shown in Figure 3, the grooves 14 are positioned thirty degrees above the horizontal axial plane of the bearing. It will be observed that the arrangement of the oil distributing passages is such that they may be formed with a minimum expenditure of time and labor. The portways 13 may be easily drilled in a drill press with the bearing in its normal position and without resorting to the use of special jigs and tools. It will, also, be observed that the desired distribution of oil is accomplished without altering the box 1, so that the bearing embodying the present invention may be easily substituted for the bearings heretofore in use and without changing existing associated parts to accommodate the bearing thereto. The grooves 12 branching from one side of the well 11 are preferably disposed in staggered relation to those grooves 12 branching from the other side of the well 11 in order to more evenly distribute the oil. The bearing 2 is preferably lined with Babbitt metal 15. The bearing 2 is preferably cast with conical depressions in the outer ends of the grooves 12 to facilitate the locating and centering of the drill in the drilling of the holes 13.

An inspection of Figure 3 discloses that, although the top surface 8 of the "brass" 2 abuts against the underside of the top wall 16 of the outer structure 1, the brass block 2 fits loosely between the opposing lateral walls 17 and the oblique walls 18 of the housing 1, affording sufficient room or play between the "brass" 2 and the housing structure 1 to permit the brass to expand or contract therein independently of the expansion or contraction of the housing in response to change in temperature.

Applicant has found that, in prior bearings of this character, operated with a packing in a chamber or cellar underneath the axle, which feeds lubrication to the journal, the oil is sheared off in any pockets or recesses that are located in the top area of the bearing and, therefore, comes up through the top oil hole in the bearing instead of descending therein to the axle, a gage connected to the oil hole showing that the rising oil therein develops a hydrostatic pressure of over two hundred pounds per square inch. Applicant, therefore, discovered that, if the oil-discharging recess were placed in the internal face of the bearing as low as forty-five degrees above the horizontal axial plane of the bearing, or lower, the oil would then feed into the bearing, instead of out of it, as in the aforesaid prior bearings. Applicant further discovered that the flow of oil would be governed automatically by the operation of the bearing. These features of improvement are disclosed in the drawing, and the operation is apparent. If the bearing is receiving insufficient lubrication from the customary packing 4, it will rise in temperature. The expansion rate of the bronze of the bearing 2 being much greater than that of the steel of the axle 3, the bearing block 2 expands, retracting the sides of the bearing from the axle, and increasing the pressure in the top or center, thereby unsealing the mouths of the grooves 14 and permitting oil to flow therefrom into the interstice between the journal and the bearing. When the bearing cools, the sides of the brass approach the axle, and restrict the flow of oil from the grooves 14 accordingly. The flow of lubricant is thus regulated automatically as required to prevent overheating of the bearing or waste of lubricant. The outer structure 1 is ordinarily a steel casting, but it will be understood and appreciated that, even if it is formed of the same material as the bearing block 2, the block 2 should be free to expand or contract therein independently of the outer structure, since the latter, being more exposed, tends to cool more rapidly and experiences less change in temperature than the block 2. It should also be noted that, when the bearing expands, due to rise of temperature, and permits space between the sides of the bearing and the journal, particles of waste, grit or impurities will be carried under the bearing. The recess pockets 14, containing free oil, will catch and hold such impurities, preventing their being carried through that portion of the bearing upon which the pressure or load is maintained.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. The combination, with a journal, of a journal-bearing embodying an outer structure and a bearing member positioned therein so as to be unrestrained against expansion or contraction in response to change in temperature, the said member having a greater coefficient of expansion than the journal, and the bearing being provided with a passageway for lubricant that discharges under a lateral portion only of the journal-engaging face of the said member, the arrangement being such that the said lateral portion of the journal-engaging face of the said member recedes from the journal as the temperature rises and approaches the journal as the temperature falls, thereby automatically regulating the flow of lubricant into the interstice between the journal and the bearing, so as to prevent overheating or waste of lubricant, said lateral portion closely fitting the journal at moderate temperatures to prevent waste of lubricant.

2. The combination, with a journal, of a journal-bearing embodying an outer structure and a bearing member positioned therein so as to be unrestrained against expansion or contraction in response to change in temperature, the said member having a larger coefficient of expansion than the journal, and the bearing being provided with lubricant conduits that discharge respectively only under opposing lateral portions of its journal-engaging face, the organization being such that the said lateral portions closely fit the journal at moderate temperatures and recede from the journal as the temperature rises and approach the journal as the temperature falls, thereby automatically governing the flow of lubricant into the interstice between the journal and the bearing, whereby waste of lubricant or overheating is prevented.

3. The combination, with a journal, of a journal-bearing embodying an outer structure and a bearing member positioned therein so as to have clearance for transverse expansion or contraction in response to change in temperature, the bearing member being sufficiently extended circumferentially along the lateral portion of the journal so that the said lateral extended portion closely fits the journal at moderate temperatures and recedes from the journal as the temperature rises and approaches the journal as the temperature falls, thereby automatically regulating the flow of lubricant into the interstice between the journal and the lateral portion of the bearing as required, the arrangement being such that lubricant supplied to the outer top face of the bearing member enters the said interstice at a point wholly within the journal-engaging face and not more than forty-five degrees above the horizontal axial plane of the bearing.

4. In a journal-bearing, an outer structure and a bearing-"brass" positioned therein so as to have clearance for transverse expansion or contraction in response to change in temperature, the bearing-"brass" having a longitudinally extended lubricant-holding pocket at only a lateral portion of the journal-engaging surface thereof, the arrangement being such that the pocket will catch and hold particles of waste, grit, or other impurities before they are carried through the top portion of the bearing upon which the pressure or load is maintained, the said lateral portion closely fitting the journal at moderate temperature and receding therefrom as the temperature rises above the moderate temperature.

5. In a journal-bearing structure, means for lubricating the underside of the journal, and a crown-bearing member having a coefficient of expansion greater than that of the journal and arranged in the structure to permit such expansion and being provided with a lubricant duct that opens into the lateral portion of the journal-engaging face of the crown member, the said duct opening being substantially sealed by the journal when moderate temperatures are being maintained by the lubrication applied to the underside of the journal, but being retracted from the journal by the greater expansion of the crown member to permit egress of lubricant from the said opening when the journal becomes excessively hot.

6. In a journal-bearing, the combination of the hollow outer structure and a "crown-brass" positioned therein so as to be free to expand or contract normally in response to change in temperature, the outer structure having a central oil duct extending from the top thereof to the top of the said brass, the brass having a longitudinally elongated central groove in its upper face and a plurality of transversely disposed branches extending from the opposite sides of said groove and having their ends terminating into downwardly directed portways, each portway emerging into a longitudinally extending distribution groove in the opposed respective lateral internal surfaces of said "brass", the mouths of said distribution grooves being positioned above the lower edges of said lateral internal surfaces and not less than forty-five degrees from the vertical axial plane of the brass, the said lateral internal surfaces closely fitting the journal at moderate temperatures to seal the said opening.

SAMUEL W. CRAWFORD.